United States Patent Office 2,813,094
Patented Nov. 12, 1957

2,813,094

CYCLIC DERIVATIVES OF 3-HYDROXY-Δ⁵-PREGNENE-20-CARBOXAMIDE

Leonard N. Nysted, Highland Park, Ill., assignor, by mesne assignments, to G. D. Searle & Co., Skokie, Ill., a corporation of Delaware No Drawing. Application February 16, 1955, Serial No. 488,713

10 Claims. (Cl. 260—239.5)

The present invention relates to a new group of cyclic amides of steroids and, more particularly, to cyclic derivatives of 3-hydroxy-5-pregnene-20-carboxamide which can be represented by the general structural formula

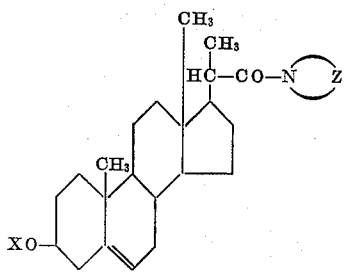

where X is a member of the class consisting of hydrogen, benzoyl and lower alkanoyl radicals and wherein

is a heterocyclic radical attached to the carbonyl radical through the nitrogen in the heterocycle.

In the foregoing structural formula the radical X can represent a hydrogen, benzoyl, or lower alkanoyl radical such as formyl, acetyl, propionyl, butyryl, pentanoyl, hexanoyl, cyclopentanepropionyl, cyclohexaneacetyl, and the like. The radical

can be a nitrogen-containing heterocyclic radical such as a piperazino, N'-alkylpiperazino, thiamorpholino, quinolino, or isoquinolino radical but of special importance for the purposes of this invention are compounds in which

represents a morpholino radical or a radical wherein Z represents a lower alkylene radical containing 4–5 carbon atoms in nuclear position as in the case of the pyrrolidino and piperidino radicals.

The cyclic amides of this invention can be conveniently prepared by reacting an amine of the structural formula

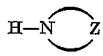

wherein all symbols are defined as hereinabove, with an equivalent of the corresponding 3-hydroxy- or 3-alkanoyloxy-5-pregnene-20-carbonyl halide in an inert organic solvent such as a lower dialkyl ether or an aromatic hydrocarbon solvent such as benzene, toluene, or xylene.

The compounds of this invention have valuable pharmaceutical properties, particularly as cardiovascular agents. They have a digitalis-like action on the heart and they antagonize the hypertensive effects of the mineralocorticoid hormone, desoxycorticosterone. These compounds are also valuable as intermediates in organic synthesis. In particular, their carbonyl group can be reduced to a methylene group by heating with lithium aluminum hydride and the resulting 20-aminomethyl-5-pregnen-3β-ol derivatives are valuable hypotensive and cardioregulatory agents.

The following examples will illustrate in further detail the compounds which constitute this invention and methods for their synthesis. However, the invention is not to be construed as limited by the details set forth in spirit or in scope, as it will be obvious to those skilled in the art that numerous modifications in materials and in methods can be adopted without departing from the invention. In these examples quantities of materials are indicated in parts by weight.

*Example 1*

A mixture of 50 parts of 3-acetoxy-5-pregnen-20-ylcarboxylic acid, 22 parts of thionyl chloride and 710 parts of ether is maintained at room temperature for 3 hours, after which the solvent and the excess thionyl chloride are removed by vacuum distillation. The residue is dissolved in benzene and the resulting solution is concentrated to dryness under high vacuum.

To a solution of 50 parts of piperidine in 4500 parts of benzene are added 50 parts of 3β-acetoxy-5-pregnene-20α-carbonyl chloride. After stirring at room temperature for an hour the reaction mixture is poured into water. The benzene solution is separated, washed successively with potassium hydroxide, hydrochloric acid and water, dried, concentrated under vacuum and crystallized from acetone and petroleum ether. The N-(3β-acetoxy-5-pregnen-20α-ylcarbonyl)-piperidine thus obtained melts at about 202–203° C. It has the structural formula

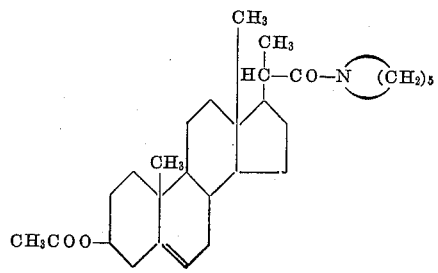

*Example 2*

To a solution of 8.4 parts of pyrrolidine in 900 parts of benzene are added 10 parts of 3β-acetoxy-5-pregnene-20α-carbonyl chloride. The mixture is agitated at room temperature for an hour and then poured into water. The organic layer is separated, washed successively with aqueous sodium hydroxide solution, hydrochloric acid and water, dried and concentrated under vacuum to yield N - (3β - acetoxy - 5 - pregnen - 20α - ylcarbonyl)pyrrolidine. The infrared absorption spectrum shows maxima at 5.7 and 6.1 microns. The compound has the structural formula

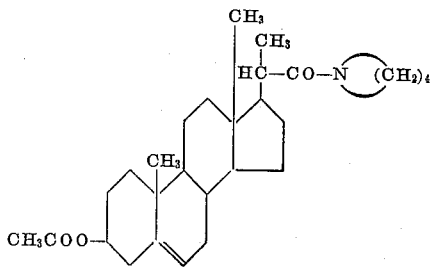

*Example 3*

A mixture of 11.5 parts of 3-benzoyloxy-5-pregnene-20α-carboxylic acid, 4.2 parts of thionyl chloride, 0.01 part of pyridine and 140 parts of ether are stirred at room temperature for 3 hours after which the solvent and excess thionyl chloride is removed under vacuum. A small amount of benzene is added and the resulting solution is taken to dryness. The residue is treated with 10 parts of piperidine and 1000 parts of ether and thus refluxed for 90 minutes after which it is poured into water. The ether solution is separated, washed successively with potassium hydroxide and water, dried and concentrated under vacuum to yield N-(3β-benzoyloxy-5-pregnen-20α-ylcarbonyl)piperidine which has the structural formula

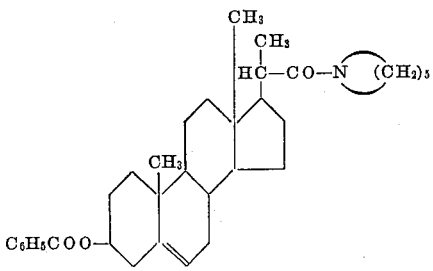

The infrared absorption spectrum shows maxima at 5.7 and 6.1 microns.

*Example 4*

One part of N-(3β-acetoxy-5-pregnen-20α-ylcarbonyl)piperidine is refluxed for 1 hour with 10 parts of a 6% solution of potassium hydroxide in methanol. Upon treatment with ice water, there precipitates N-(3β-hydroxy-5-pregnen-20α-ylcarbonyl)piperidine which has the structural formula

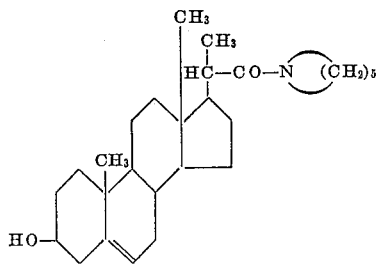

The infrared absorption spectrum shows maxima at 2.7 and 6.1 microns.

*Example 5*

A solution of 5 parts of 3β-acetoxy-5-pregnene-20α-carbonyl chloride and 5 parts of morpholine in 400 parts of ether is refluxed for 90 minutes and then poured into water. The ether layer is separated, washed successively with potassium hydroxide and water, dried over anhydrous sodium sulfate and stripped. The residue is recrystallized from acetone to yield N-(3β-acetoxy-5-pregnen-20α-yl carbonyl)morpholine which melts at about 225–231° C. The compound has the structural formula

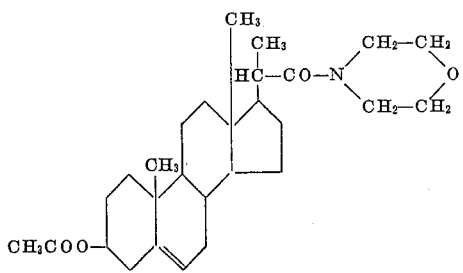

*Example 6*

On substitution of 3β-butyroxy-5-pregnen-20α-carbonyl chloride, prepared from 5 parts of 3β-butyroxy-5-pregnene-20α-carboxylic acid, for the 3β-acetoxy-5-pregnene-20α-carbonyl chloride used in the foregoing example there is obtained the N-(3β-butyroxy-5-pregnen-20α-ylcarbonyl)morpholine of the structural formula

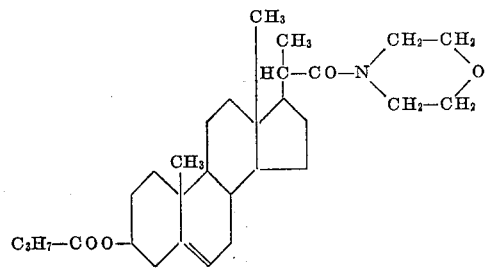

The infrared absorption spectrum of this compound shows a maximum at 5.7 microns.

*Example 7*

Two parts of N-(3β-acetoxy-5-pregnen-20α-ylcarbonyl)morpholine are heated at reflux with 25 parts of a 5% solution of potassium hydroxide in methanol. The reaction mixture is then cooled and treated with water whereupon there precipitates N-(3β-hydroxy-5-pregnen-20α-ylcarbonyl)morpholine which has the structural formula

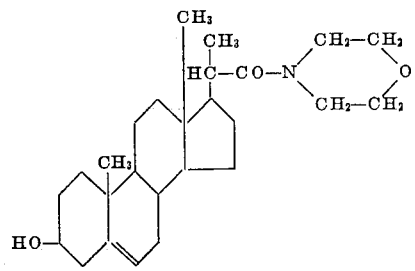

The infrared absorption spectrum shows a maximum at 2.7 microns.

*Example 8*

A mixture of 25 parts of N-(3β-acetoxy-5-pregnen-20α-ylcarbonyl)piperidine and 25 parts of lithium aluminum hydride in 5500 parts of anhydrous ether is refluxed for 4 hours and then refluxed for an additional hour with 250 parts of ethyl acetate. The reaction mixture is then treated with water and the ether solution is separated, washed with water, dried over anhydrous calcium sulfate and filtered. A stream of anhydrous hydrogen chloride is passed through the ether solution and the resulting precipitate is collected on a filter, washed with ether and recrystallized from methanol. The resulting hydrochloride of 20α-piperidinomethyl-5-pregnen-3β-ol melts with decomposition at about 270–300° C.

*Example 9*

A mixture of 5 parts of N-(3β-acetoxy-5-pregnen-20α-ylcarbonyl)pyrrolidine and 5 parts of lithium aluminum hydride in 1100 parts of anhydrous ether is refluxed for 3 hours and then refluxed for an hour with 50 parts of ethyl acetate. After addition of water the mixture is extracted with ether and the ether solution is washed with water, dried over anhydrous calcium sulfate and filtered. Dry hydrogen chloride is bubbled into the ether solution and the resulting precipitate is collected on a filter, washed with ether and recrystallized from methanol to yield the high melting crystalline hydrochloride of 20α-pyrrolidinomethyl-5-pregnen-3β-ol. The infrared absorption spectrum shows maxima at about 2.7 and 6.1 microns.

*Example 10*

A mixture of 2 parts of N-(3β-acetoxy-5-pregnen-20α-ylcarbonyl)morpholine and 2 parts of lithium aluminum hydride in 220 parts of ether is refluxed for 3 hours and then heated for an hour with 20 parts of ethyl acetate. It is then poured into water and extracted with ether. The ether solution is washed with water, dried over anhydrous calcium sulfate and filtered. Dry hydrogen chloride is bubbled into the ether solution until precipitation is completed. The precipitate is collected on a filter, washed with ether and recrystallized from methanol to yield the hydrochloride of 20α-morpholinomethyl-5-pregnen-3β-ol which melts at about 285–295° C. with decomposition.

What is claimed is:

1. A compound of the structural formula

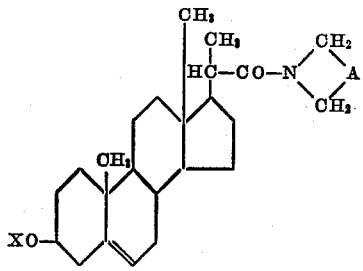

wherein X is a member of the class consisting of hydrogen, benzoyl and lower alkanoyl radicals and wherein A is a member of the class consisting of —CH₂CH₂—, —CH₂CH₂CH₂— and —CH₂OCH₂— radicals.

2. A compound of the structural formula

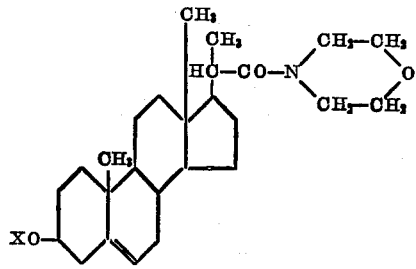

wherein X is a lower alkanoyl radical.

3. A compound of the structural formula

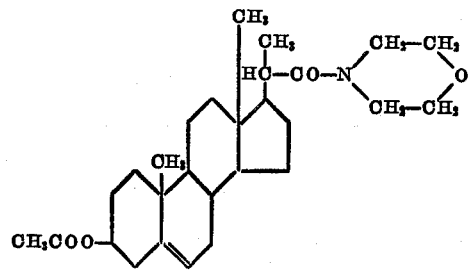

4. A compound of the structural formula

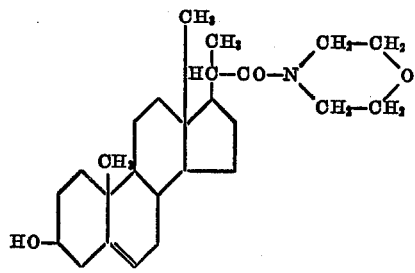

5. A compound of the structural formula

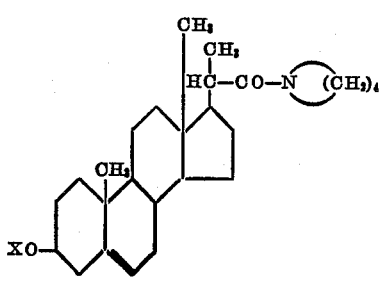

wherein X is a lower alkanoyl radical.

6. A compound of the structural formula

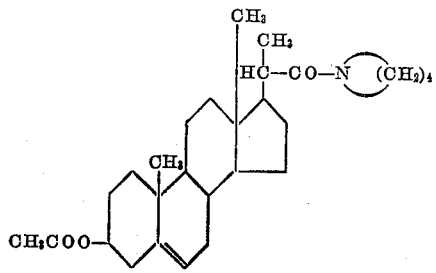

7. A compound of the structural formula

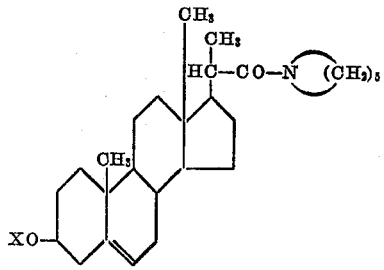

wherein X is a lower alkanoyl radical.

8. A compound of the structural formula

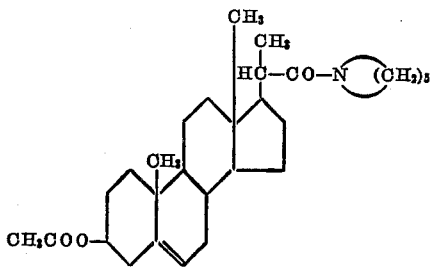

9. A compound of the structural formula

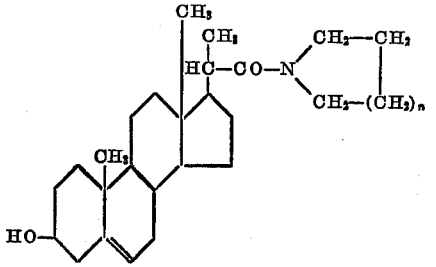

wherein n is a positive interger less than three.

10. A compound of the structural formula

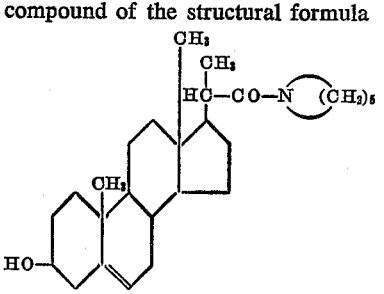

References Cited in the file of this patent
UNITED STATES PATENTS 2,705,232   Dodson _____ Mar. 29, 1955

OTHER REFERENCES

Cole et al.: J. Am. Chem. Soc., vol 67, pp. 1369–1375 (1945).

Herr et al.: J. Am. Chem. Soc., vol. 72, pp. 1753–1756 (1950).

Herr et al.: J. Am. Chem. Soc., vol. 74, pp. 3627–3630 (1952).